United States Patent
Mangano et al.

(10) Patent No.: US 8,688,872 B2
(45) Date of Patent: Apr. 1, 2014

(54) METHOD AND DEVICE FOR MANAGING QUEUES, AND CORRESPONDING COMPUTER PROGRAM PRODUCT

(75) Inventors: Daniele Mangano, Messina (IT); Giovanni Strano, Giarra (IT); Salvatore Pisasale, Catania (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 268 days.

(21) Appl. No.: 12/951,268

(22) Filed: Nov. 22, 2010

(65) Prior Publication Data
US 2011/0131189 A1    Jun. 2, 2011

(51) Int. Cl.
*G06F 3/00*     (2006.01)
*G06F 5/00*     (2006.01)

(52) U.S. Cl.
USPC ................................. 710/54; 710/52; 710/55

(58) Field of Classification Search
USPC ............................................. 710/52, 54, 55
See application file for complete search history.

(56) References Cited

U.S. PATENT DOCUMENTS

| | | | | |
|---|---|---|---|---|
| 5,214,607 A * | 5/1993 | Duzan | ........................... | 365/221 |
| 5,237,683 A * | 8/1993 | Kitsuregawa et al. | ......... | 709/201 |
| 5,396,595 A * | 3/1995 | Standley | ........................ | 710/68 |
| 5,893,924 A * | 4/1999 | Vakkalagadda | ............... | 711/165 |
| 6,219,773 B1 * | 4/2001 | Garibay et al. | ............... | 711/201 |
| 6,233,231 B1 * | 5/2001 | Felix et al. | .................... | 370/335 |
| 6,487,212 B1 * | 11/2002 | Erimli et al. | ................... | 370/413 |
| 6,614,798 B1 * | 9/2003 | Bishop et al. | ................. | 370/428 |
| 6,920,112 B1 * | 7/2005 | McCloghrie et al. | ......... | 370/252 |
| 7,027,547 B1 * | 4/2006 | Hwang | .......................... | 375/372 |
| 7,451,261 B2 * | 11/2008 | Saito et al. | ....................... | 711/3 |
| 7,818,744 B2 * | 10/2010 | Wang et al. | .................... | 718/100 |
| 7,873,763 B2 * | 1/2011 | Liu et al. | ......................... | 710/52 |

(Continued)

FOREIGN PATENT DOCUMENTS

| EP | 797325 A2 * | 9/1997 | ............... H04J 3/06 |
|---|---|---|---|
| EP | 1315100 | 5/2003 | |

(Continued)

OTHER PUBLICATIONS

Malekpour, A.; Carzaniga, A.; Carughi, G.T.; Pedone, F., "Probabilistic FIFO Ordering in Publish/Subscribe Networks," Network Computing and Applications (NCA), 2011 10th IEEE International Symposium on , pp. 33,40, Aug. 25-27, 2011.*

(Continued)

*Primary Examiner* — Faisal M Zaman
(74) *Attorney, Agent, or Firm* — Allen, Dyer, Doppelt, Milbrath & Gilchrist, P.A.

(57) ABSTRACT

A method for managing a queue, such as for example a FIFO queue, and executing a look-ahead function on the data contained in the queue includes associating to the data in the queue respective state variables (C1, C2, ... CK), the value of each of which represents the number of times a datum is present in the queue. The look-ahead function is then executed on the respective state variables, preferentially using a number of state variables (C1, C2, ... CK) equal to the number of different values that may be assumed by the data in the queue. The look-ahead function can involve identification of the presence of a given datum in the queue and is, in that case, executed by verifying whether among the state variables (C1, C2, ... CK) there exists a corresponding state variable with non-nil value.

15 Claims, 5 Drawing Sheets

(56) References Cited

U.S. PATENT DOCUMENTS

| | | | |
|---|---|---|---|
| 7,876,769 B2 * | 1/2011 | Gupta et al. | 370/428 |
| 8,472,400 B2 * | 6/2013 | Chun et al. | 370/330 |
| 2001/0036201 A1 * | 11/2001 | Dieterich et al. | 370/506 |
| 2006/0155924 A1 | 7/2006 | Dwyer et al. | |
| 2006/0190661 A1 * | 8/2006 | Ogilvie et al. | 710/310 |
| 2007/0005742 A1 * | 1/2007 | Eldar et al. | 709/223 |
| 2007/0177701 A1 * | 8/2007 | Thanigasalam | 375/372 |
| 2008/0129367 A1 * | 6/2008 | Murata et al. | 327/355 |
| 2008/0189345 A1 * | 8/2008 | Guenter | 708/443 |
| 2009/0276673 A1 * | 11/2009 | Kone et al. | 714/749 |
| 2010/0279672 A1 * | 11/2010 | Koskela et al. | 455/418 |

FOREIGN PATENT DOCUMENTS

| | | | | |
|---|---|---|---|---|
| JP | 63003356 A | * | 1/1988 | G06F 13/12 |
| JP | 63232626 A | * | 9/1988 | H03M 7/40 |
| JP | 05108297 A | * | 4/1993 | G06F 3/14 |
| JP | 08051621 A | * | 2/1996 | H04N 7/24 |

OTHER PUBLICATIONS

Cheng-Shang Chang; Cheng, J.; Duan-Shin Lee; Chi-Feung Wu, "Quasi-Output-Buffered Switches," Parallel and Distributed Systems, IEEE Transactions on , vol. 22, No. 5, pp. 833,846, May 2011.*

Lee, P.-N.; Yiwei Chen; Holdman, J.M., "DRISP: a versatile scheme for distributed fault-tolerant queues," Distributed Computing Systems, 1991., 11th International Conference on , pp. 600,607, May 20-24, 1991.*

Mneimneh, S.S.; Sharma, V.; Kai-Yeung Siu, "On scheduling using parallel input-output queued crossbar switches with no speedup," High Performance Switching and Routing, 2001 IEEE Workshop on , pp. 317,323, 2001.*

* cited by examiner

METHOD AND DEVICE FOR MANAGING QUEUES, AND CORRESPONDING COMPUTER PROGRAM PRODUCT

FIELD OF THE INVENTION

The present disclosure relates to queue-management techniques and can be applied, for example, to managing first-in/first-out (FIFO) queues in the field of so-called systems-on-chip (SoCs). The disclosure has been developed with attention paid to its possible use in situations in which it is desirable to know in advance the contents of a queue, such as a FIFO queue (i.e. a "look-ahead" function).

BACKGROUND OF THE INVENTION

System-on-chip technology today facilitates provision of even rather complex systems for communication between different modules of an integrated circuit (for example, a processing unit, memories, peripherals, and other dedicated units) so as to ensure observance of the specifications of performance of the system.

Various applications foresee the use of first-in/first-out (FIFO) queues between devices with different clock frequencies. For example, a FIFO queue can be set between a first device, for example a microprocessor, which writes information in the FIFO queue and a second device, for example a peripheral or a second microprocessor, which reads the information from the FIFO queue. Each device reads and writes data in the FIFO queue with a rate equal to that of its own clock. However, FIFO queues can be used also in synchronous systems.

In complex digital systems, the possibility of carrying out a sort of "anticipation" by investigating the subsequent contents of a queue, an operation that is also known by the term "look-ahead", can be particularly useful for anticipating execution of some processes or tasks and for implementing specific system functions. Currently, specific known approaches to address this problem are not available.

The inventors have noted that, in principle, an approach represented in FIG. 1 could be envisaged, in which, for search of a value, all the data stored in the FIFO queue are checked. In the communication between a master node 10 and a slave node 20 control information is exchanged on control lines 16. This occurs both in the case where the two nodes 10 and 20 use two different clocks and in the case where the two nodes use one and the same clock. The master node is responsible for "writing" or storing new data in a FIFO queue 30, getting them to travel on an input line 12, while the slave node 20 is responsible for "reading" or extracting the data stored in the queue 30 through an output line 14. The master node 10 thus works at a first end of the FIFO queue 30, while the slave node 20 works at the other end.

The presence of the FIFO queue 30 serves to enable coexistence of the two domains with different clock frequency. The FIFO queue 30 can be in particular a buffer used for regulating the flow of data in the communication between devices that work at different rates. It will on the other hand be appreciated that, in on-chip communication systems, the use of buffers is not necessarily linked to the need to regulate the flow of data between devices that work at different speeds. Other examples of possible use of buffers are: protocol conversion, packeting as in the case of network-on-chip, or conversion of data size.

The module designated in FIG. 1 by the reference number 25 represents the prediction, or look-ahead, unit. The approach here hypothesized envisages a parallel check of all the data stored in the FIFO queue 30. Each module contained in the unit 25, and designated by the reference number 40, is fundamentally a comparator module designed to compare the values present on its inputs 42, 44 with the purpose of selecting and issuing at output 46 the desired value (which can be a value sought, the maximum value, or the minimum value). The value selected by the comparator 40 is then made available at output and used as input for the next comparator 40 in the cascade, which compares it with a next element in the FIFO queue 30. At the end of all the comparisons, the value sought is made available by the unit 25 at output on the line 18.

This approach may prove, however, very slow and costly: in fact, for a queue of size N, N−1 comparators are used and there is a long critical path provided by the cascade of the comparators. Furthermore, this approach may prove far from flexible in so far as the length of the critical path and the production cost increase with the increase of the length of the queue.

SUMMARY OF THE INVENTION

On the basis of the above premises, there emerges the need to have available an efficient, low-cost, and high-performance mechanism for executing the look-ahead operation in a queue, such as for example a FIFO queue. Such an approach is frequently required by components present in the system that are located downstream of the queue, for example for anticipating execution of a given task. The look-ahead technique substantially implies the fact of investigating the contents of a memory, for example to identify the maximum or minimum value of a subset of bits or for detecting the presence or otherwise of a given value within the queue, without carrying out an exhaustive check on the contents.

An object of the invention is to provide an approach that is able to satisfy such requirements. According to the invention, these and other objects are provided by a method for managing a queue, such as for example a FIFO queue, and executing a look-ahead function on the data contained in the queue that includes associating to the data in the queue respective state variables, the value of each of which represents the number of times a datum is present in the queue. The look-ahead function is then executed on the respective state variables, preferentially using a number of state variables equal to the number of different values that may be assumed by the data in the queue. The look-ahead function can involve identification of the presence of a given datum in the queue and is, in that case, executed by verifying whether among the state variables there exists a corresponding state variable with non-nil value. It is also possible to organize the state variables in a monotonically ordered sequence in which the position of each state variable corresponds to the datum to which it is associated. The look-ahead function that involves identification of the datum in the queue having maximum value or minimum value can in this case be executed by identifying the datum as the one corresponding to the state variable of non-nil value occupying one of the end positions in the ordered sequence.

The invention also refers to a corresponding device, as well as to a computer program product that can be loaded into the memory of at least one computer and comprises portions of software code that are able to implement the method when the product is run on at least one computer.

As used herein, the reference to such a computer program product is understood as being equivalent to the reference to a computer-readable means containing instructions for control of the processing system for coordinating implementation of the method according to the invention. The reference to "at least one computer" is evidently meant to highlight the possibility of the present invention being implemented in a modular form and/or in a distributed form.

Various embodiments are suited to being applied to synchronous and asynchronous codes, likewise enabling at each cycle output of updated information from the queue.

BRIEF DESCRIPTION OF THE DRAWINGS

The invention will now be described, purely by way of non-limiting example, with reference to the annexed drawings, in which.

DETAILED DESCRIPTION OF THE PREFERRED EMBODIMENTS

Illustrated in the ensuing description are various specific details aimed at providing an in-depth understanding of the embodiments. The embodiments can be implemented without one or more of the specific details, or with other methods, components, materials, etc. In other cases, known structures, materials, or operations are not illustrated or described in detail so that various aspects of the embodiments will not be obscured.

The reference to "an embodiment" or "one embodiment" in the framework of this description indicates that a particular configuration, structure or characteristic described in relation to the embodiment is comprised in at least one embodiment. Hence, phrases such as "in an embodiment" or "in one embodiment" that may be present in different points of this description do not necessarily refer to one and the same embodiment. Furthermore, particular conformations, structures, or characteristics can be combined adequately in one or more embodiments. The references are used herein only for convenience and hence do not define the sphere of protection or the scope of the embodiments.

In particular, it will be appreciated that, whereas the present description draws attention, above all for simplicity of reference, to the application to queues of a FIFO type, various embodiments are suited to being used in relation to queues of any type.

Figure 1:
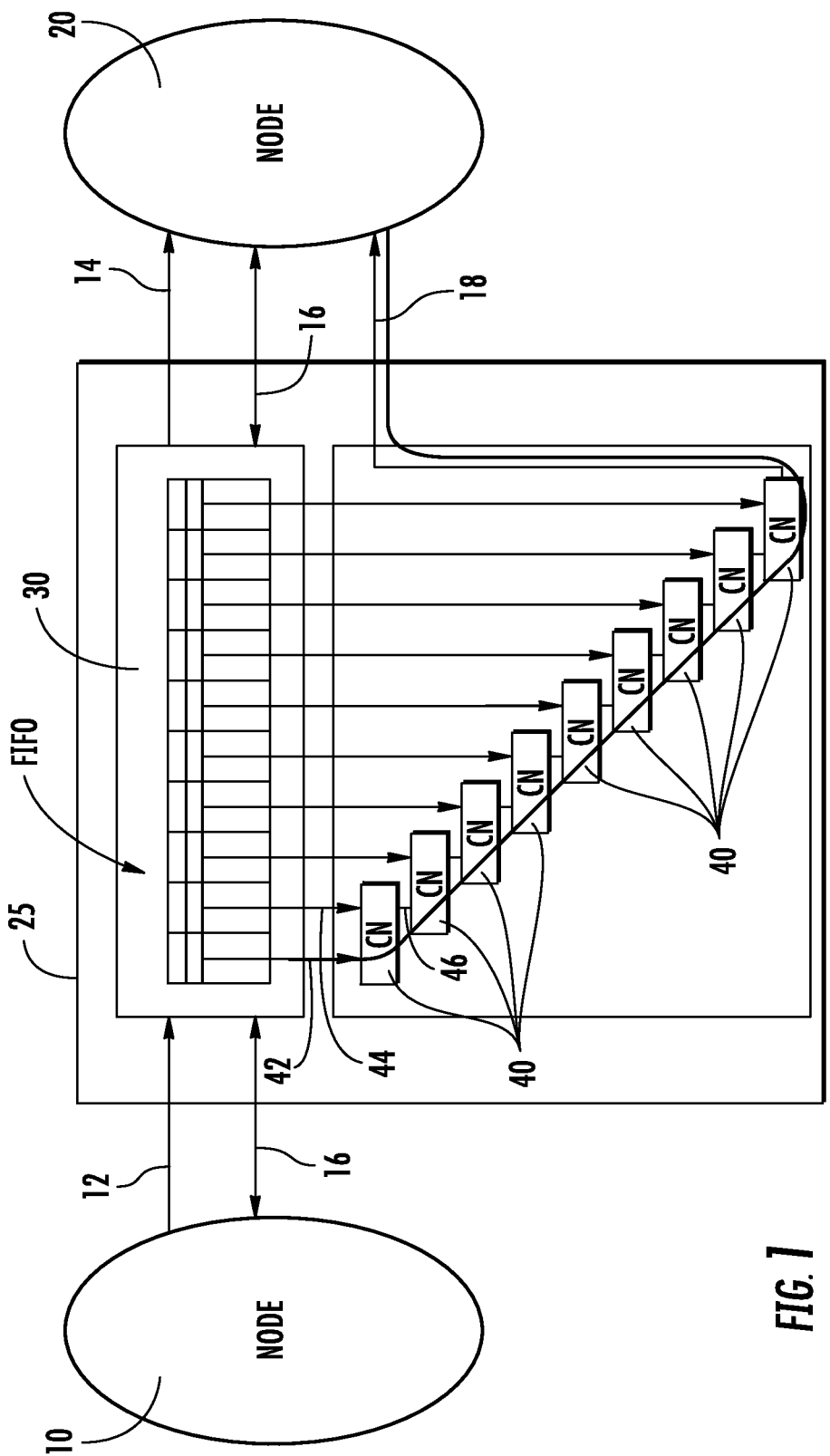
FIG. 1 is a schematic diagram illustrating a look ahead approach.

The general idea underlying various embodiments is that of managing a set of state variables, which, at each clock cycle, enable knowledge of the data stored in a queue, such as for example a FIFO queue. In this way, it is possible to avoid examination of all the data present in the FIFO queue by reading each item thereof, as in the case hypothesized with reference to FIG. 1.

In various embodiments it is sufficient to examine the contents of some interfaces in which the state variables are updated only when a datum is written and/or read into/from the queue. These state variables are used for calculating the output value of the look-ahead mechanism.

In various embodiments, the state variable associated to a value that is present n times in the FIFO queue has a value equal to n, whereas the state variable associated to a value that is not present in the FIFO queue has a nil value. If the aim of the look-ahead function is to examine the presence or otherwise of a given value, it may be sufficient to have available just one state variable.

The state variable could be in principle also a variable of a Boolean type, in which associated to each of the two states is the condition of value present or value absent. A variable of a Boolean type does not on the other hand enable management of situations in which various occurrences of the value sought are present in the queue. In general, the different state variables enable tracing of the presence of different values, while the possibility of the single variable assuming different values enables management of the situation in which there are several occurrences of that particular value in the queue.

In the case where the aim is to find the maximum value or the minimum value among the data stored in a FIFO queue, the number of state variables can be equal to the number of values that the subset of data to be monitored can assume. Hence, there will be a state variable associated to each possible value that can be assumed by the elements in the queue. In this case, in various embodiments, it is possible to organize the state variables in a monotonically ordered sequence in which the position of each state variable corresponds to the data to which it is associated. The look-ahead function that entails identification of the datum in the queue having maximum or minimum value is performed by identifying the datum as the one corresponding to the state variable of non-nil value occupying one of the end positions in the ordered sequence.

It will be appreciated that the approach can be extended also to look-ahead operations of a more complex nature, such as for example determination of the average (for example, weighted average) of the values of the data in the queue. Each state variable identifies in fact a corresponding data value, and the value assumed by the variable indicates how many times (never, once or else a number of times, and how many times) the value is present. In fact, with the approach described herein, the set of the state variables, and the values assumed thereby, constitute in practice a "histogram" of the contents of the queue designed to be updated whenever a value is written (entered) in and/or read (extracted) from the FIFO queue.

In various embodiments, during each clock cycle, only the value of a state variable is incremented or decremented by one unit. As has been seen, the state variables can be obtained, for example, via counters, and each counter can be able to count up to a value equal to the length of the FIFO queue (in the case where stored in the FIFO queue are values that are all equal, the state variable associated to the value will assume a value equal to the length of the queue).

Figure 2:
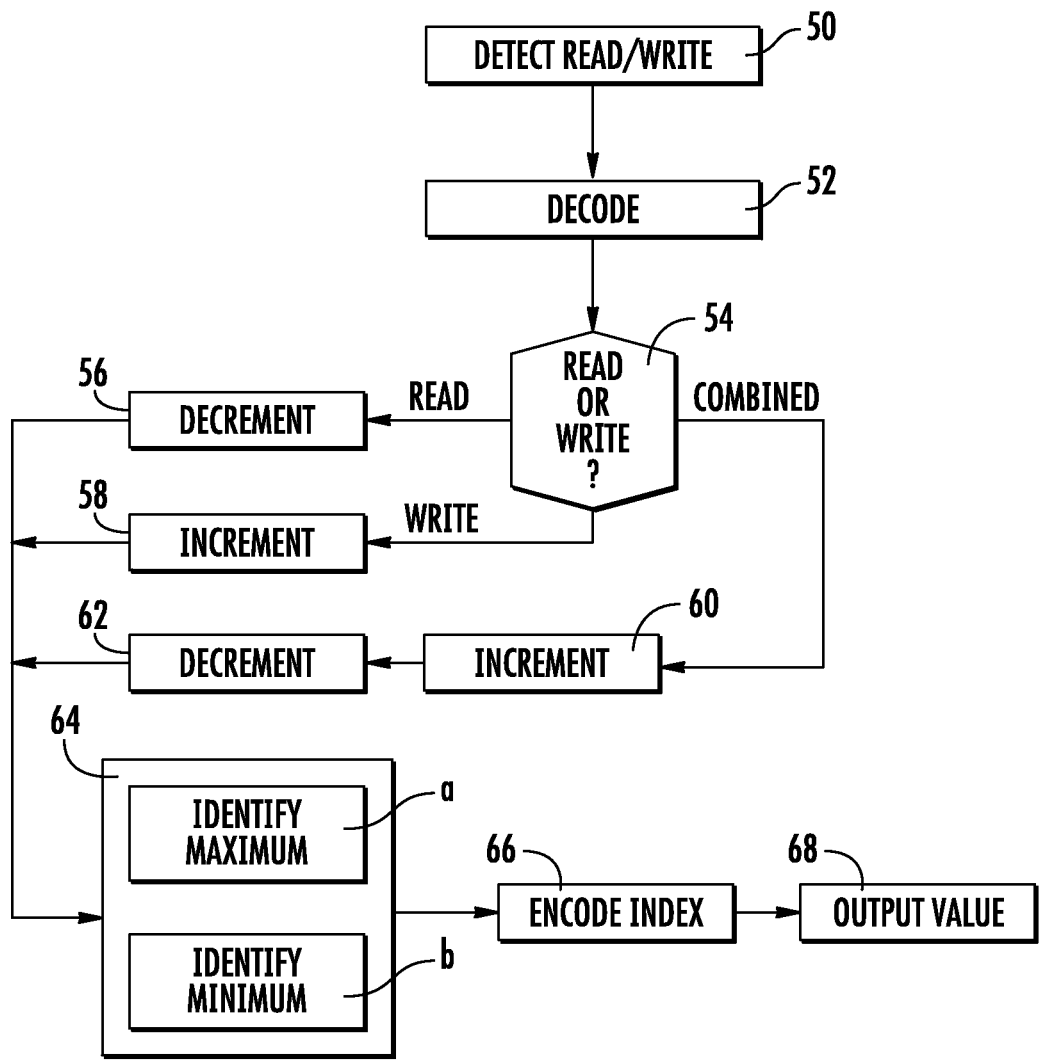
FIG. 2 is a block diagram of the main steps of an approach according to the present invention.

The steps of the example of embodiment considered herein are illustrated with reference to the flowchart of FIG. 2 and are executed at each clock cycle to obtain at output the result of the look-ahead scanning. Detected in step 50 is a write/read event that concerns the FIFO queue 30. In the step 52 the datum is decoded and control passes to the next selection step 54. In the case of a write operation, in step 56 the state variable addressed by the index Wi and regarding write operations is decremented. Instead, in the case of a read operation, in step 58 a state variable addressed by the index Ri and regarding read operations is incremented. Finally, in the case of a combined read and write operation, in step 60 the state variable addressed by the index Ri is incremented, and in a step 62 the state variable addressed by the index Wi is decremented.

In any case, at the end of these operations of updating of the state variables it is possible to continue with the step 64 in which the index of the block of the FIFO queue that contains the maximum value or the minimum value is identified. In particular, in step 64a the maximum index from among the non-nil variables is sought, and this index identifies the position in which the maximum value is located. In like manner, in a step 64b the minimum index from among the non-nil variables is sought, and this index identifies the position in which the minimum value is located. At output from step 64 there is the index that identifies the position of the value sought. Finally, in step 66 the index is encoded and at the next step 68 the maximum value/minimum value sought is made available.

Figure 3:
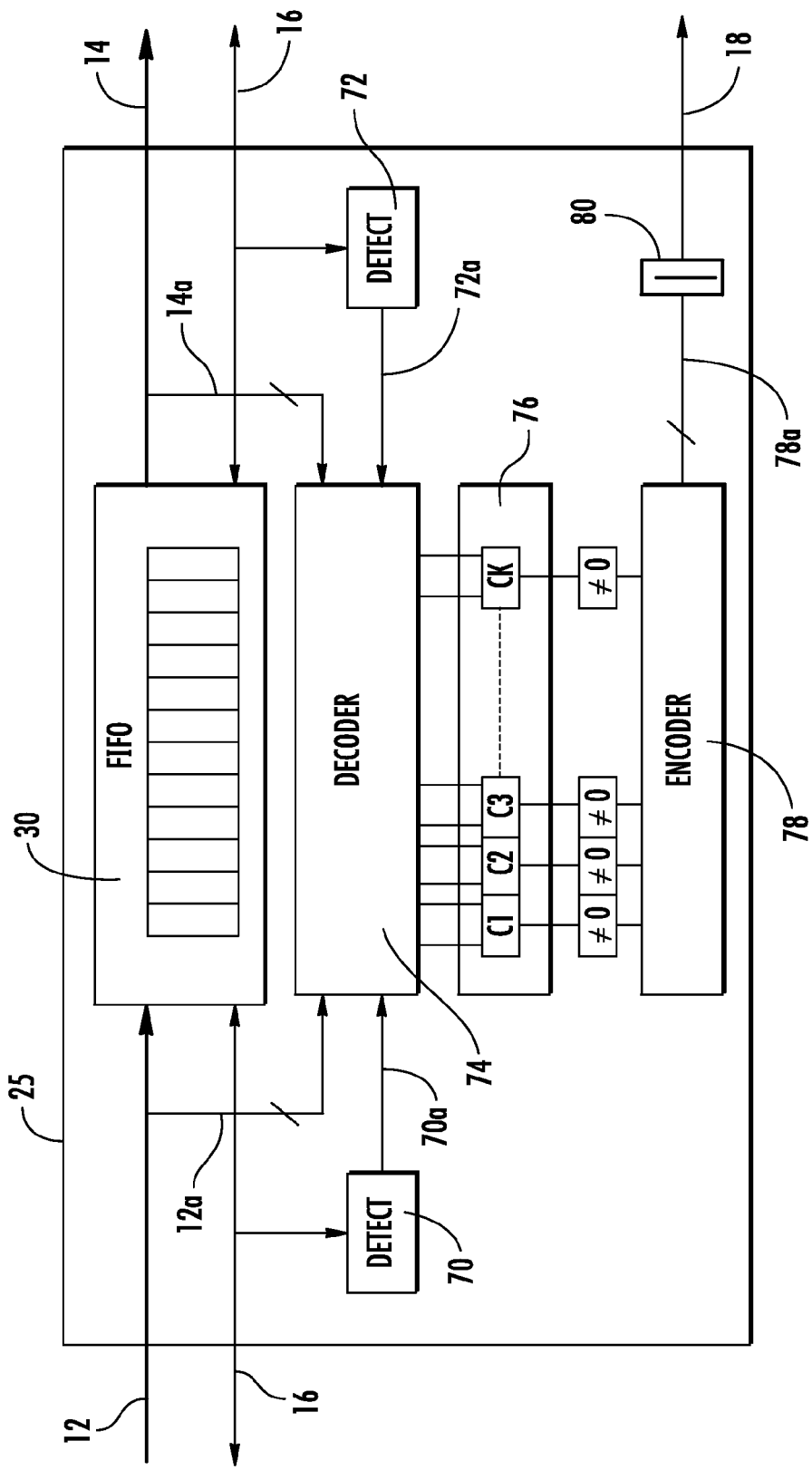
FIG. 3 is a schematic diagram illustrating an embodiment of the present invention with respect to a synchronous queue.
Figure 4:
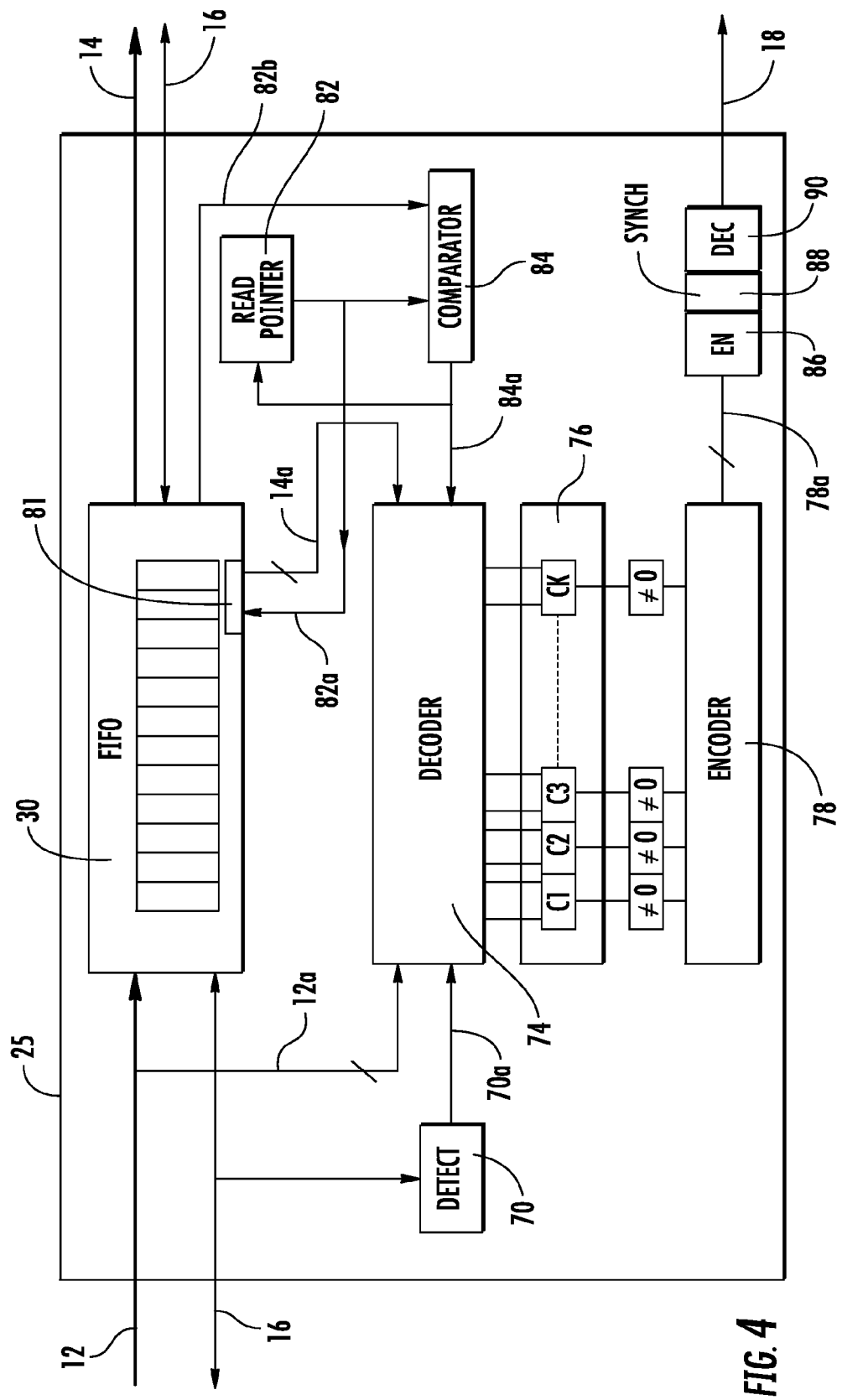
FIG. 4 is a schematic diagram illustrating another embodiment of the present invention with respect to an asynchronous queue.

In practice, synchronous queues and asynchronous queues are used, and in what follows the different architectures of the units for execution of the look-ahead operations will be described in detail. With reference to FIGS. 3 and 4, two possible embodiments are illustrated in the synchronous case and in the asynchronous case, respectively. As compared to the approach illustrated in FIG. 1, the cascade of comparator modules is replaced by a series of modules, the functions of which will be described below.

In the more general case, the FIFO queue is able to manage the control flow both at the input interfaces and at the output interfaces (usually this function is based upon a validation and acknowledgement protocol).

The modules 70 and 72 represent, respectively, a module for detection of a write operation and a module for detection of a read operation. In particular the modules 70 and 72 used for detecting write/read operations are combinational circuits that detect, respectively, whether the data are written or read in/from the FIFO queue. Their function depends upon the particular protocol for control of the flow implemented by the FIFO queue. For a flow-control protocol based upon the validation and acknowledgement (valid/ACK) paradigm, this circuit amounts to an AND logic port.

The modules C1, C2, . . . CK contained in the module 76 are counter modules. The number of counters K is equal to the number of the possible values that the X bits present on the lines 12a and 14a can assume. Each counter present in the module 76 has a dimension equal to the value of the length of the FIFO queue. The output logic has the function of detecting when the output of the counter is other than zero.

The decoder module 74 provides: incrementing by one unit of the value contained in the counter identified via the X bits present on the line 12a if a write operation is identified, i.e., if an enable signal arrives at input on the line 70a; and decrementing by one unit of the value contained in the counter identified via the X bits present on the line 14a if a read operation is identified, i.e., if an enable signal arrives at input on the line 72a. The function of the encoder module 78 depends instead upon the particular type of look-ahead operation to be executed.

As mentioned previously, in various embodiments the number K of the counters C1, C2, . . . CK is equal to the number of values that the elements of the FIFO queue can assume. The counter C1 is associated to the lowest value that can be present within the FIFO queue, while the counter CK is associated to the highest value that can be present within the FIFO queue. If a counter CJ is zero it means that the value associated thereto is not present in the FIFO queue. In fact, not necessarily all the possible values are present simultaneously in the queue. A single value can be repeated a number of times and others may not be present within the FIFO queue.

There are thus present K counters, and each counter other than zero indicates the presence in the FIFO queue of the value associated to the counter. Furthermore, if the contents of the counter is greater than 1 it means that the value is present a number of times in the FIFO queue (and this means that there will be at least one nil counter).

In the case where the maximum value is sought, the output of the encoder 78 corresponds to the input value other than zero that is in the position on the extreme right; i.e., the counter other than zero with the highest index is sought (starting from K down to 1). Instead, in the case where the minimum value is sought, the output of the encoder 78 corresponds to the input value other than zero that is in the position on the extreme left; i.e., the counter other than zero with the lowest index is sought (starting from 1 up to K). Alternatively, to verify whether a given value is present or otherwise in the FIFO queue, it is sufficient to verify whether the output of the corresponding counter is other than zero.

In general, in one and the same look-ahead unit 25, multiple decoding techniques can be implemented to obtain different look-ahead information at the same time The register module 80 (which is an optional module) has the purpose of re-timing the output, to break the combinational path and have a sufficient margin in terms of time. Tests conducted in 65-nm technology have shown that the encoder 78 can function properly at frequencies in the region of 700 MHz.

In the asynchronous case, the FIFO queues are generally written and read using different clocks that are not synchronized with one another. In this case, the embodiment appearing in FIG. 3 can be modified, as illustrated in FIG. 4. Since, according to the approach proposed, the look-ahead logic mechanism functions in the domain of the clock referred to the write operations, there is the need to synchronize the inputs of the decoder module 74 (i.e., the ones present on the right in FIG. 4) with the output of the encoder module 78 (i.e., the look-ahead information present on the line 18).

For this purpose, it is possible to envisage the use of a synchronization chain, implemented according to the typical "brute force" approach, to be used at output from the encoder. The same approach in the case of the inputs of the encoder could cause the loss of data, and in turn the loss of data would alter the value of the state variables, thus damaging execution of the method.

In this regard, it is possible to generate, in a generator module 82, a local read pointer 82a in the first clock domain. The local pointer 82a is used for reading the FIFO queue at a local level and is compared in a comparison module 84 with the synchronised pointer present on the line 82b. The comparison serves to establish whether the FIFO queue has been read and whether the state variables are to be updated. Whenever the local pointer is different from the synchronised pointer, an enable signal 84a that enables decrementing of the counter identified by the X bits present on the line 14a is generated by the comparison module 84. Finally, the output of the encoder 78 can be encoded according to a Gray code in a module 86, synchronized in a module 88, and decoded in a module 90. Finally, presented hereinafter are some observations useful for understanding operation of various embodiments of the architecture of FIG. 4.

The approach for managing asynchronous FIFO queues can envisage the read pointer 82a being generated by the generator 82 in the read domain and being synchronized also with the write domain. When the local pointer 82a differs from the synchronized one, the generator of the local pointer 82 can increment its output by one unit, and the decoder 74 can be authorized to decrement one of the counters 76 (the one selected via the value defined by the X bits coming from the output port of the local pointer 82a of the FIFO queue). The local read port of the FIFO queue works in the first clock domain and is managed via the local pointer 82a. The look-ahead information present on the line 18 can be synchronized via the typical brute-force approach, and, to avoid spurious values, also a Gray encoding can optionally be used.

Figure 5:
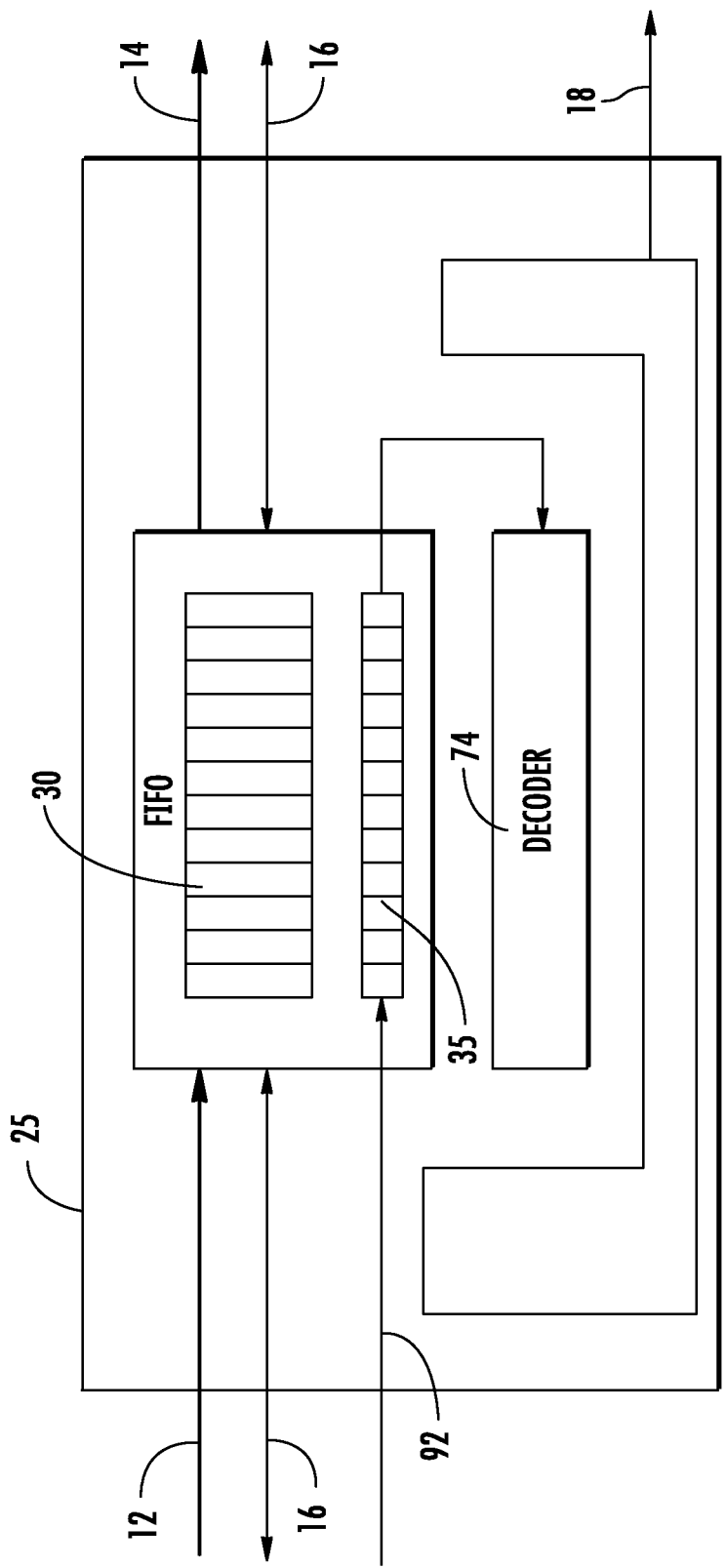
FIG. 5 is a schematic diagram illustrating an alternative embodiment of the present invention.

According to the particular application, a different approach can be used, including the storage of the necessary information in a separate FIFO queue, as illustrated in FIG. 5. In particular, a separate FIFO queue 35 is created, which is addressed through a separate bus 92 and which contains the information on the state variables. The approach is possible whenever there is no need to forward this information together with the inputs of the FIFO queue. The operation of writing in the separate FIFO queue is managed like that for the main FIFO queue (same write pointer WR and same control signals). The operation of reading of the separate FIFO queue in the synchronous case is managed like the one in the main FIFO queue, whereas in the asynchronous case it is managed via the local read pointer. However, in the asynchronous case there is no need to have a local read port in the main FIFO queue.

In general, the approach proposed is used when there is the need to analyze a particular subset of bits. Other typical applications are: management of the quality of service (QoS) in on-chip communications systems (for example, networks-on-chip); memory controllers for reorganizing and optimizing accesses to the memory; and central processing units (CPUs) of a general-purpose or specialized type for optimizing execution of a pipeline type.

The look-ahead approach described herein affords high performance (in terms of clocks) and a low cost (due to the area occupied). Furthermore, with the approach the look-ahead operation does not affect the performance of the queue. When working on an asynchronous queue, synchronization is guaranteed to limit the risk of conditions of meta-stability. Other possible applications are represented by traffic management in such a way as to reorganize the accesses to the memory areas for optimizing system performance.

Of course, without prejudice to the principle of the invention, the details and the embodiments may vary, even significantly, with respect to what has been described herein purely by way of example, without thereby departing from the scope of the invention, as defined by the annexed claims. In particular, it should be emphasized that, while the present description has concentrated attention on its application to queues of a FIFO type, various embodiments are suited to being used in relation to queues of any type.

That which is claimed is:

1. A method of managing a queue comprising:
performing a look-ahead function of data stored in the queue, and including
associating respective state variables to the data in the queue, the respective state variables having values representative of a number of times a given datum is present in the queue,
performing the look-ahead function on the respective state variables,
detecting writing and reading of data in the queue,
incrementing the value of the respective associated state variable when a datum is written in the queue, and
decreasing the value of the respective associated state variable when a datum is read from the queue,
wherein performing the look-ahead function further includes detecting the presence of a given datum in the queue and checking whether among the state variables there exists a corresponding state variable having a non-nil value, and
wherein performing the look-ahead function further comprises identifying a datum in the queue having one of a maximum and minimum value, and identifying the datum as corresponding to the state variable having a non-nil value occupying an end position in an ordered sequence.

2. The method of claim 1, wherein a number of state variables used is equal to a number of different values assumed by the data in the queue.

3. The method of claim 1, further comprising arranging the state variables in a monotonically ordered sequence; wherein the state variables are ordered according to values of the data to which they are associated.

4. The method of claim 1, wherein the queue comprises a first-in first-out (FIFO) queue.

5. A method of performing a look-ahead function of data stored in a queue, the method comprising:
associating respective state variables to the data in the queue;
detecting writing and reading of data in the queue;
incrementing a value of the respective associated state variable when a datum is written in the queue;
decreasing the value of the respective associated state variable when a datum is read from the queue; and
performing the look-ahead function on the respective state variables including detecting the presence of a given datum in the queue and checking whether among the state variables there exists a corresponding state variable having a non-nil value, and identifying a datum in the queue having one of a maximum and minimum value, and identifying the datum as corresponding to the state variable having a non-nil value occupying an end position in an ordered sequence.

6. The method of claim 5, wherein a number of state variables used is equal to a number of different values assumed by the data in the queue.

7. The method of claim 5, further comprising arranging the state variables in a monotonically ordered sequence according to values of the data to which they are associated.

8. The method of claim 5, wherein the queue comprises a first-in first-out (FIFO) queue.

9. A queue management device comprising:
a counter module configured to associate respective state variables to data stored in a queue, the respective state variables having values representative of a number of times a given datum is present in the queue;
an encoder module configured to perform a look-ahead function of data stored in a queue based upon the respective state variables;
a write detect module;
a read detect module; and
a decoder module, associated with the write detect module and the read detect module, and configured to increment the value of the respective associated state variable when a datum is written in the queue, and decrease the value of the respective associated state variable when a datum is read from the queue;
wherein the encoder module performs the look-ahead function by detecting the presence of a given datum in the queue and checking whether among the state variables there exists a corresponding state variable having a non-nil value, and by identifying a datum in the queue having one of a maximum and minimum value, and identifying the datum as corresponding to the state variable having a non-nil value occupying an end position in an ordered sequence.

10. The queue management device of claim 9, wherein the counter module uses a number of state variables equal to a number of different values assumed by the data in the queue.

11. The queue management device of claim 9, wherein the counter module includes output circuitry to determine whether among the state variables there exists a state variable corresponding to a given datum in the queue and having a non-nil value.

12. The queue management device of claim 9, wherein the counter module is configured to arrange the state variables in a monotonically ordered sequence according to values of the data to which they are associated.

13. The queue management device of claim 9, wherein the queue comprises a first-in first-out (FIFO) queue.

14. A non-transitory computer readable medium including computer executable software code portions for performing a look-ahead function of data stored in the queue, and including:

associating respective state variables to the data in the queue, the respective state variables having values representative of a number of times a given datum is present in the queue;

detecting writing and reading of data in the queue;

incrementing the value of the respective associated state variable when a datum is written in the queue; and decreasing the value of the respective associated state variable when a datum is read from the queue; and performing the look-ahead function on the respective state variables including detecting the presence of a given datum in the queue and checking whether among the state variables there exists a corresponding state variable having a non-nil value, and identifying a datum in the queue having one of a maximum and minimum value, and identifying the datum as corresponding to the state variable having a non-nil value occupying an end position in an ordered sequence.

15. The non-transitory computer readable medium of claim 14, wherein a number of state variables used is equal to a number of different values assumed by the data in the queue.

* * * * *

UNITED STATES PATENT AND TRADEMARK OFFICE
CERTIFICATE OF CORRECTION

| | | |
|---|---|---|
| PATENT NO. | : 8,688,872 B2 | Page 1 of 1 |
| APPLICATION NO. | : 12/951268 | |
| DATED | : April 1, 2014 | |
| INVENTOR(S) | : Daniele Mangano, Giovanni Strano and Salvatore Pisasale | |

It is certified that error appears in the above-identified patent and that said Letters Patent is hereby corrected as shown below:

On the title page    Insert -- Foreign Application Priority Data
item 30              Nov. 27, 2009   (IT) ......................TO2009A000927 --

Signed and Sealed this
Second Day of June, 2015

Michelle K. Lee
*Director of the United States Patent and Trademark Office*